United States Patent
Röder et al.

(10) Patent No.: US 6,361,469 B1
(45) Date of Patent: Mar. 26, 2002

(54) PARKING LOCK FOR A VEHICLE HAVING AN ELECTRICAL DRIVE, AND AN ELECTRICAL DRIVE FOR A VEHICLE

(75) Inventors: Manfred Röder, Bergrheinfeld; Horst Oppitz, Dittelbrunn, both of (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/570,121

(22) Filed: May 12, 2000

(30) Foreign Application Priority Data

May 12, 1999 (DE) .......................................... 199 21 918

(51) Int. Cl.[7] .......................... H02P 15/00; H02P 3/04; H02P 7/04
(52) U.S. Cl. ............................... 477/24; 477/29; 188/69
(58) Field of Search .......................... 477/24–29, 901; 180/65.1–65.6; 188/68, 69

(56) References Cited

FOREIGN PATENT DOCUMENTS

| DE | 32 45 425 | 6/1984 | ........... B60K/17/02 |
|----|-----------|--------|----------------------|
| DE | 93 13 666.8 | 12/1993 | ........... H02K/7/102 |

Primary Examiner—Charles A. Marmor
Assistant Examiner—Tisha D. Lewis
(74) Attorney, Agent, or Firm—Cohen, Pontani, Lieberman & Pavane

(57) ABSTRACT

A parking lock for a vehicle having an electrical drive train including an electric machine with a rotor, a stator having a plurality of stator windings, and power electronics for controlling the electric machine, and a transmission prevents the vehicle from rolling away inadvertently. The parking lock has a mechanical component which is mechanically operatively connected to the rotor when the parking lock is operated to stop rotation of this rotor. The mechanical component has a ratchet wheel and a toothed catch. Furthermore, the parking lock has an electrical component designed such that it produces a short-circuit in the stator windings, at least temporarily, when it is intended to operate the parking lock. When the parking lock is operated, the electrical component is thus activated in a specific time interval before operation of the mechanical component. The short-circuit in the stator windings produces a severe braking torque, which brakes the rotor. The time interval between activation of the electrical component and the activation of the mechanical component allows the rotor to be braked before the mechanical component is activated. In this way, the high torque peaks which occur when the rotor is being stopped are reduced by the electrical component, so that a mechanical component of relatively small size may be used.

23 Claims, 2 Drawing Sheets

PARKING LOCK FOR A VEHICLE HAVING AN ELECTRICAL DRIVE, AND AN ELECTRICAL DRIVE FOR A VEHICLE

BACKGROUND OF THE INVENTION

1. Field of the Invention

The present invention relates to a parking lock for a vehicle having an electrical device, and to a method for operating such a parking lock. The present invention also relates to an electrical drive for a vehicle.

2. Description of the Related Art

Motor vehicles such as passenger vehicles have a parking brake for preventing the vehicle from rolling away inadvertently when the vehicle is parked. A problem with known parking brakes in terms of safety is that in some cases the parking brake cannot completely prevent the vehicle from rolling away inadvertently, particularly when said vehicle is located on a grade.

For this reason, it is desirable to use a parking lock in addition to the parking brake. The parking lock is intended to make it impossible for the vehicle to roll away inadvertently at any time and in any place. In particular, the parking lock is designed to prevent the vehicle from rolling away when the vehicle is parked on a grade.

When the vehicle includes a conventional internal combustion engines with a manual transmission, the additional parking lock may be provided by also selecting a low gear, for example the reverse gear or the like, in addition to operating the actual parking brake. In this solution, the compression forces and friction forces in the internal combustion engine produce a braking effect which supplements the braking force of the parking brake.

However, when the vehicles includes an internal combustion engine and an automatic transmission, the selection of a low gear for producing the braking effect to supplement the parking brake cannot be produced because of the torque converter that is present in the automatic transmission. Therefore, automatic transmissions use separate parking locks instead of a selected gear. The parking lock may, for example, comprise a mechanical interlock in the transmission output shaft on the transmission housing. A ratchet wheel may be provided for this purpose, which is provided with teeth and is arranged on the transmission output shaft such that it rotates with that shaft. Furthermore, a toothed catch is arranged on the transmission housing so that it latches in the spaces between the teeth of the ratchet wheel. When the parking lock is operated and when the vehicle speed is appropriately low, the toothed catch latches suddenly in the ratchet wheel, thereby suddenly stopping the rotary movement of the transmission output shaft. The loads which occur as the catch latches in can generally be damped by the elasticity that exists in the drive train, for example by means of appropriate joints, jointed shafts, suspension, tire damping or the like.

No separate parking lock has yet been provided for vehicles with an electrical drive. Nevertheless, for the same reasons mentioned above, the additional parking lock is also desirable for these vehicles. In fact, electrical drives are subject to different problems relating to the possible use of parking locks, in particular when, as described above, the aim is to use parking locks with a ratchet wheel and a toothed catch.

The electrical drive of a vehicle normally has an electrical machine comprising a rotor, a stator and power electronics for controlling the electrical machine. The torque produced by the rotation of the rotor is in this case used as the basis of the drive for the vehicle. If a parking lock comprising the toothed catch and ratchet wheel as described above were to be used, the rotor rotation would have to be braked via the ratchet wheel and the toothed catch. When the toothed catch suddenly latches in the ratchet wheel, the rotor is suddenly brought to rest. Due to the high torques and the rotor inertia, very high forces are produced by the sudden stop in rotation which are not damped as easily as in the configuration having an internal combustion engine and automatic transmission.

Accordingly, conventional commercially available parking locks can not be used since they would not be adequate for withstanding the occurring loads and would be damaged very quickly. To overcome this problem, parking locks of considerably greater size would have to be used or damping elements would have to be integrated into the parking locks. However, both of these solutions necessitate a large installation volume and would have a very high intrinsic weight, which is a major disadvantage, particularly in automobile construction. Furthermore, parking locks of such a design are considerably more expensive. Furthermore, the development of appropriately modified parking locks for the electrical drive of a vehicle would involve a major time penalty and design effort.

Since the high torque peaks and reductions to be compensated for occur only during the latching-in process, and thus only very briefly, the use of parking locks designed for these maximum loads would not be acceptable financially, for the reasons stated above.

SUMMARY OF THE INVENTION

An object of the present invention is to provide a parking lock and an electrical drive for a vehicle, in which the described disadvantages are avoided. More specifically, it is an object of the present invention to provide a parking lock for use with an electric drive that is physically simple and cost-effective.

According to an embodiment of the invention, the object is achieved by a parking lock for a vehicle having an electrical drive train, wherein the electrical drive train includes an electrical machine with a rotor, a stator having a number of stator windings, and power electronics for controlling the electrical machine, the parking lock having a mechanical component which is mechanically operatively connectable to the electrical drive train when the parking lock is operated to stop rotary movement of the electric drive train.

According to the present invention, this parking lock is distinguished in that it has both a mechanical component and an electrical component. The mechanical component may be mechanically operatively connected to the electrical drive train when the parking lock is operated to stop the rotary movement of the electric drive train. Examples of this will be described in more detail further on in the description. The electrical component is designed for producing a short-circuit in the stator windings, at least temporarily, when it is intended to operate the parking lock. The present invention also provides for the electrical component to be activated in a specific time interval before operation of the mechanical component when the parking lock is operated.

The parking lock according to the invention also allows vehicles having an electrical drive to be provided with a simple and cost-effective with a braking system which protects the vehicle from rolling away inadvertently—preferably in addition to a conventional parking brake.

The fundamental idea of the parking lock according to the invention is that the characteristic properties of the electrical machine are incorporated in the parking lock. To this end, the parking lock has an electrical component in addition to the mechanical component. The electrical component is designed so that it can, at least temporarily, switch the stator windings of the stator to be active so that the individual windings of the electrical machine are connected to one another, as a result of which a short-circuit is produced in the stator windings. The short-circuit produces a high braking torque in the electrical machine. This braking torque brakes the rotary movement of the electrical drive train.

The mechanical component of the parking lock is not activated until a specific time interval has elapsed, which allows the rotary movement of the electrical drive train finally to be brought to rest in this case. Since, owing to the short-circuit, the rotary movement of the electrical drive train has already been braked by the previous braking process, high torque peaks on the mechanical component of the parking lock are avoided. This allows even relatively small parking locks to be used.

If, for example, parking locks having a ratchet wheel and toothed catch are used, parking locks of relatively small size may be used, such as those which are already used in vehicles with an automatic transmission of the same order or magnitude. These parking locks are already produced in large quantities, so that they are very cost-effective. Furthermore, such parking locks may also be produced easily.

The activation of the electrical component prior to the activation of the mechanical component thus eliminates the need for relatively large parking locks or for any additional components such as damping elements or the like to compensate for the high torque peaks that occur.

The time interval between activation of the electrical component and of the mechanical component is advantageously between 10 and 100 milliseconds. The driver of the vehicle does not notice such short time intervals. Accordingly, the prior temporary production of a short-circuit via the activation of the electrical component, which will be explained in more detail further on in the description, is not perceptible in the form of any discomfort by the driver. Nevertheless, these time intervals are long enough to initiate the braking of the rotary movement of the electrical drive train even before the activation of the mechanical component. The suitable time interval may be set as required, depending on the application. Time intervals other than those described here are also, of course, conceivable.

An example of a suitable mechanical component of the parking lock will now be described in the following text. This parking lock preferably has a toothed ratchet wheel and a toothed catch. These mechanical component correspond to a parking lock as is already used in automatic transmissions, in the manner described above. However, other types of mechanical components are also conceivable, so that the invention is not limited to the exemplary embodiment described explicitly in the following text. Any mechanical interlock for releasably holding the rotor stationary relative to the stator may be used.

The ratchet wheel is provided with teeth and may, for example, be connected to a shaft of the electrical drive train such that the ratchet wheel and shaft rotate together. The toothed catch may be attached to an appropriate housing of the electrical drive train. Upon operation of the mechanical component, the toothed catch is inserted into the ratchet wheel, thereby abruptly stopping the rotation of the ratchet wheel. However, the torque peaks which occur in this case have already been dissipated by the prior braking of the rotary movement of the electrical drive train via the electrical component.

The use of a ratchet wheel and a toothed catch as the mechanical component of the parking lock offers a number of advantages. For example, it is possible to reliably protect the vehicle against rolling away forward or backward even on a steep grade and even if any additional parking brake which may be provided is released. Furthermore, the ratchet wheel and the toothed catch can be configured appropriately to ensure that, once the interlock is latched in, it can also be released again without any difficulties, even on a steep grade.

Operation of a parking lock normally requires that the parking lock is intended to latch in reliably up to a certain speed, such as, for example less than or equal to 5 km/h. Furthermore, it is also intended to be impossible for it to latch in above a specific speed such as, for example, at speeds of 8 km/h or more. This prevents the driver from inadvertently activating the parking lock while driving. These requirements can be satisfied by using a ratchet wheel and a toothed catch. Appropriate design of the teeth and of the spaces between the teeth ensures that the ratchet teeth are thrown out of the way by the inclines on the teeth of the ratchet wheel, so that interlocking is impossible above, for example, the speed of 8 km/h or more. This process of throwing the teeth out of the way is normally audible as noise. Since already existing ratchet wheel systems may be used, the risk of inadvertent interlocking may be prevented since these systems have already been very well proven in practice.

Advantageously, the mechanical component is or can be mechanically operatively connected to the electrical drive train via an electrical or mechanical operating device when the parking lock is operated. The electrical operating device may, for example, comprise an electric motor which causes the toothed catch to engage with the ratchet wheel. However, the toothed catch may also be operated via an appropriate cable run. Other possible operative connections are, of course, also conceivable, so that the invention is not limited to the described examples.

The electrical component may advantageously have a control device via which a short-circuit is or may be produced in the stator windings. This control device is used to produce signals which are then transmitted to a component of the electrical machine such as, for example, power electronics connected to the stator. The stator windings are connected for normal operation via appropriate converters and power semiconductors located within the power electronics. The signal transmitted by the control device ensures that the interconnection of the individual stator windings is briefly changed so that they are connected to form a short-circuit.

The electrical component preferably has at least one sensor element connected to the control device. In this case, the at least one sensor element is advantageously designed to produce signals using which a short-circuit is or can be produced in the stator windings. Any system data required for activation of the electrical component can be detected, and passed on to the control device, via the at least one sensor element.

One of the sensor elements may comprise a position sensor. The position sensor is advantageous, for example, when the operation of the parking lock is initiated via a control element such as, for example, a control lever. Such an example will be explained in more detail further on in the description. When the control element is moved to a position which is intended for activation of the parking lock, this operation of the control element is detected via the position sensor. The detected data are passed on to the control device where they are further processed. The control device then produces a signal which causes the stator windings to be short-circuited.

Furthermore, the at least one sensor element may comprise a speed sensor. This sensor measures the present speed of the vehicle and passes this measurement on to the control device. The limiting value for a maximum speed may, for example, be stored in the control device, wherein the maximum speed is the speed above which the parking lock must be prevented from being activated. If the measured speed is below this maximum value, the electrical component of the parking lock may be activated. The control device will emit an appropriate signal to short-circuit the stator windings.

If the measured present speed value is above a maximum permissible limiting value, it is impossible to activate the electrical component of the parking lock, so that the stator windings are not short-circuited.

In both cases, the mechanical component may be activated independently of the activation of the electrical component. In this case, the mechanical component is activated after the specific time interval. If the present speed of the vehicle is above the limiting speed for activation of the parking lock this will, however, not lead to any problems since the mechanical component will not latch in at the higher speed. If a ratchet wheel and a toothed catch are used, the teeth of the toothed catch will be thrown away from the ratchet wheel above a specific speed as described above.

According to the second aspect of the present invention, an electrical drive is provided for a vehicle which has a drive train for driving vehicle wheels, in which case the drive train has an electrical machine with a rotor, a stator having a number of stator windings, and power electronics for controlling the electrical machine, and has a transmission. According to the invention, this electrical drive is distinguished by the provision of a parking lock according to the invention, as described above.

In the case of such an electrical drive, a parking lock can be provided using simple means and in a cost-effective manner and can be used, for example, as a second braking system in addition to a parking brake. With regard to the advantages, effects, influences and method of operation of the drive according to the invention, reference is made to the entire contents of the above statements relating to the parking lock according to the invention.

The electrical drive comprises an electrical machine for producing the required drive torque. The invention is not limited to specific machine types. However, synchronous machines and, in this case, in particular synchronous machines with permanent-magnet excitation, are advantageously used. The speed reduction or increase is carried out in the downstream transmission. The transmission may also be followed by a differential, which then transmits the drive torque to the vehicle wheels.

The mechanical component of the parking lock may advantageously be arranged rim between the electrical machine and the transmission. This is an installation point at which high speeds and relatively low torques occur. The mechanical component may comprise a ratchet wheel design which may be connected to the rotor shaft such that the shaft and ratchet wheel rotate together. The toothed catch may then be connected to the housing of the electrical machine.

In another embodiment, the mechanical component of the parking lock may be arranged between the transmission and the differential. This is an installation point at which relatively low speeds and relatively high torques occur. If a ratchet wheel design is used, the ratchet wheel can be connected to the differential cage such that they rotate together. The toothed catch may then be connected to the differential housing. Both embodiments require only a very small physical space.

The transmission may comprise an epicyclic transmission arranged coaxially with respect to the rotor shaft. Epicyclic transmissions generally have a sun wheel, a hollow wheel and various planet wheels which are arranged on a satellite carrier, with the individual wheels being arranged and aligned coaxially with respect to one another. In this way, an epicyclic transmission represents a highly effective transmission with only a small space requirement.

The mechanical component of the parking lock and the transmission may advantageously be arranged within the electrical machine. Electrical machines comprising an external rotor normally include free space at its center. Accordingly, a large portion of the transmission and the mechanical components of the parking lock may be integrated within the electrical machine. This allows particularly short physical axial lengths to be achieved.

In a further refinement, a control element such as a control lever guided in a gearshift console may be provided to operate the transmission and to operate the parking lock. In this case, the parking lock may be activated either electrically or mechanically. If the activation is electrical, stator windings are first of all short-circuited. After a short timer interval, the mechanical component is then actuated electrically. If the activation is mechanical, a switch or the like is advantageously integrated in the control element and generates a signal before the parking lock latches in mechanically, the sitch activates the short-circuiting of the stator windings.

The sensor element which is in the form of a position sensor may advantageously be connected to the control element. In this way, the movement of the control element to the appropriate park gearshift position is detected by the position sensor and the signal is then transmitted to the control device. The stator windings are short-circuited via this control device. Once the control element has reached the desired park gearshift position, the mechanical component is activated. The time delay between the production of the signal by the position sensor and the activation of the mechanical component, which corresponds to the defined time interval, is sufficient for the rotor to be braked by the short-circuit produced in the stator windings such that the mechanical connection can now be produced between the mechanical component and the rotor without overloading the mechanical parts.

The control device for the parking lock is preferably connected to the power electronics of the electrical machine.

In a further refinement, an additional parking brake can also be provided for the vehicle wheels, so that the vehicle has two braking systems, overall.

Finally, according to the third aspect of the invention, a method is provided for operating a parking lock according to the present invention for a vehicle having an electrical drive, and which is distinguished according to the present invention by the following steps: a) activating the electrical component of the parking lock for producing a short-circuit at least temporarily in the stator windings of the stator; b) activating the mechanical component of the parking lock after a specific time interval has elapsed after step a) for connecting the mechanical component to the electrical drive train and prevent rotary movement of the electric drive train.

The method according to the present invention allows the use of a parking lock even for a vehicle with an electrical drive in a simple and cost-effective manner, in which case an already known device may be used as the mechanical component of the parking lock. The mechanical component may be designed to be relatively small in comparison with the maximum possible torque peaks. The advantages, influences, effects and method of operation of the method according to the invention are described above with reference to the discussion of the parking lock according to the present invention and the electrical drive according to the present invention.

The mechanical component of the present invention may advantageously be activated 10 to 100 milliseconds after the activation of the electrical component.

The electrical component of the parking lock is preferably activated only below a specific vehicle speed, which is preferably less than or equal to 5 km/h. As has already been stated above, this prevents the stator windings from being inadvertently short-circuited above a speed at which such activation of the electrical component could be dangerous.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like references denote similar elements throughout the several views.

DETAILED DESCRIPTION OF THE PRESENTLY PREFERRED EMBODIMENTS

Figure 1:
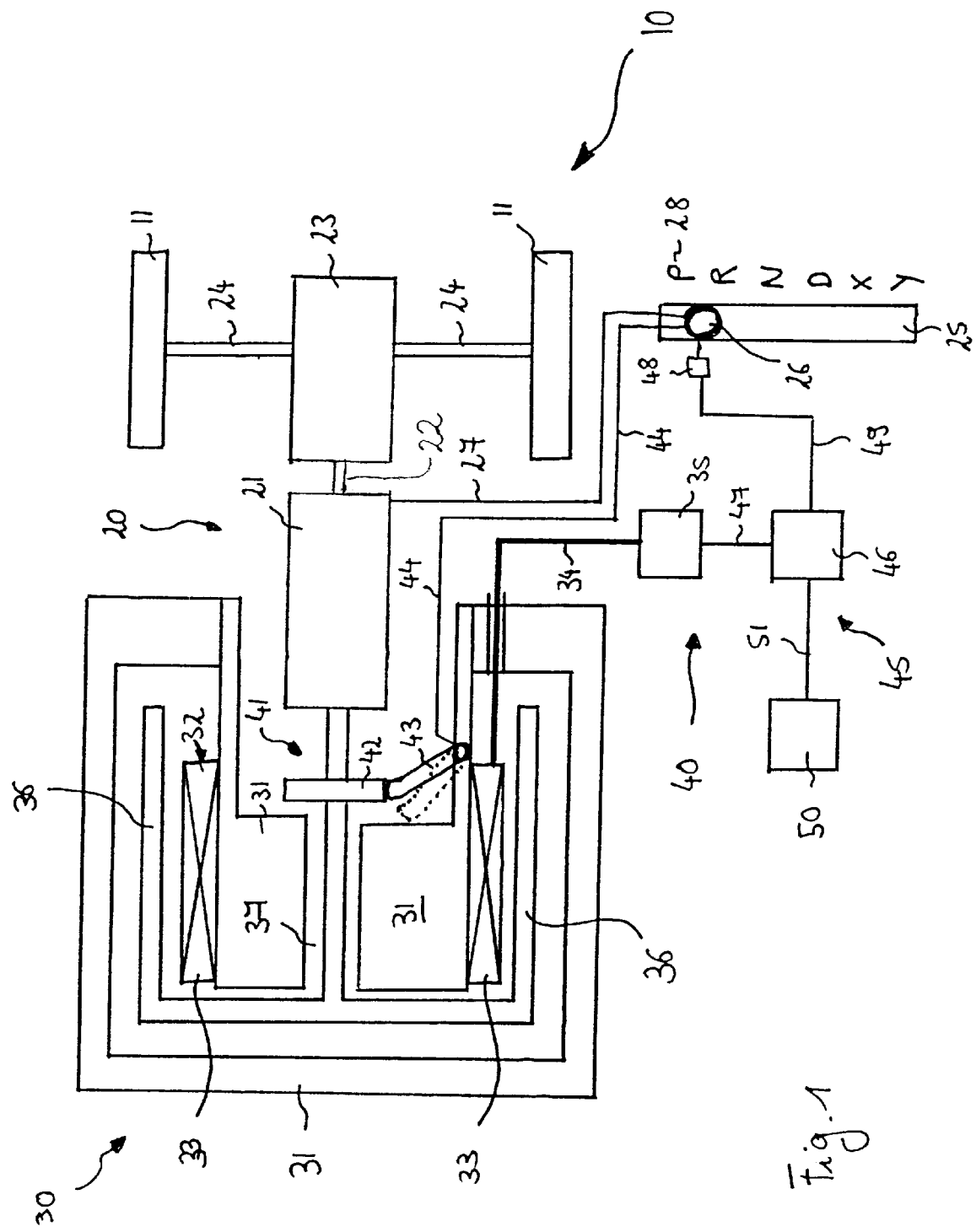
FIG. 1 shows a schematic view of an electrical drive for a vehicle according to an embodiment of the invention.

FIG. 1 is a schematic diagram of a front-wheel-drive motor vehicle 10 according to an embodiment of the present invention. In the interests of brevity and clarity, only those components which are relevant in the context of the present invention are shown. Furthermore, the individual components have not been drawn to scale.

The vehicle 10 comprises a drive train 20 which produces and transmits the drive torque to drive the vehicle 10. To produce the drive torque, the drive train 20 includes an electrical machine 30 in the form of a synchronous machine with permanent-magnet excitation that is operatively connected to a transmission 21 which may, for example, comprise an epicyclic transmission. The transmission 21 is coupled to a differential 23, which then transmits the drive torques via axles 24 to two wheels 11 of the vehicle 10.

The electrical machine 30 is designed with a multi-part housing 31 in which an external rotor 36 and a stator 32 are arranged. A plurality of stator windings 33 are arranged on the stator 32. These stator windings 33 are connected to one another and are further connected to power electronics 35 via appropriate electrical connections 34. The power electronics 35 are used to control the electrical machine 30. The rotor 36 comprises a rotor shaft 37 operatively connected to the transmission 21. The rotation of the rotor 36 produces a torque which is transmitted via the rotor shaft 37 to the transmission 21. The torque is stepped down or stepped up in the transmission 21 and then transmitted via the transmission output shaft 22 to the differential 23, where it is split and is transmitted to the two wheels 11.

In one preferred embodiment, the drive train 20 is designed such that the transmission 21 comprises an epicyclic transmission with a sun wheel and a satellite carrier to which planet wheels are fitted. The sun wheel is connected to a rotor 36. The differential 23 is operatively connected to the satellite carrier of the epicyclic transmission 21.

Figure 2:
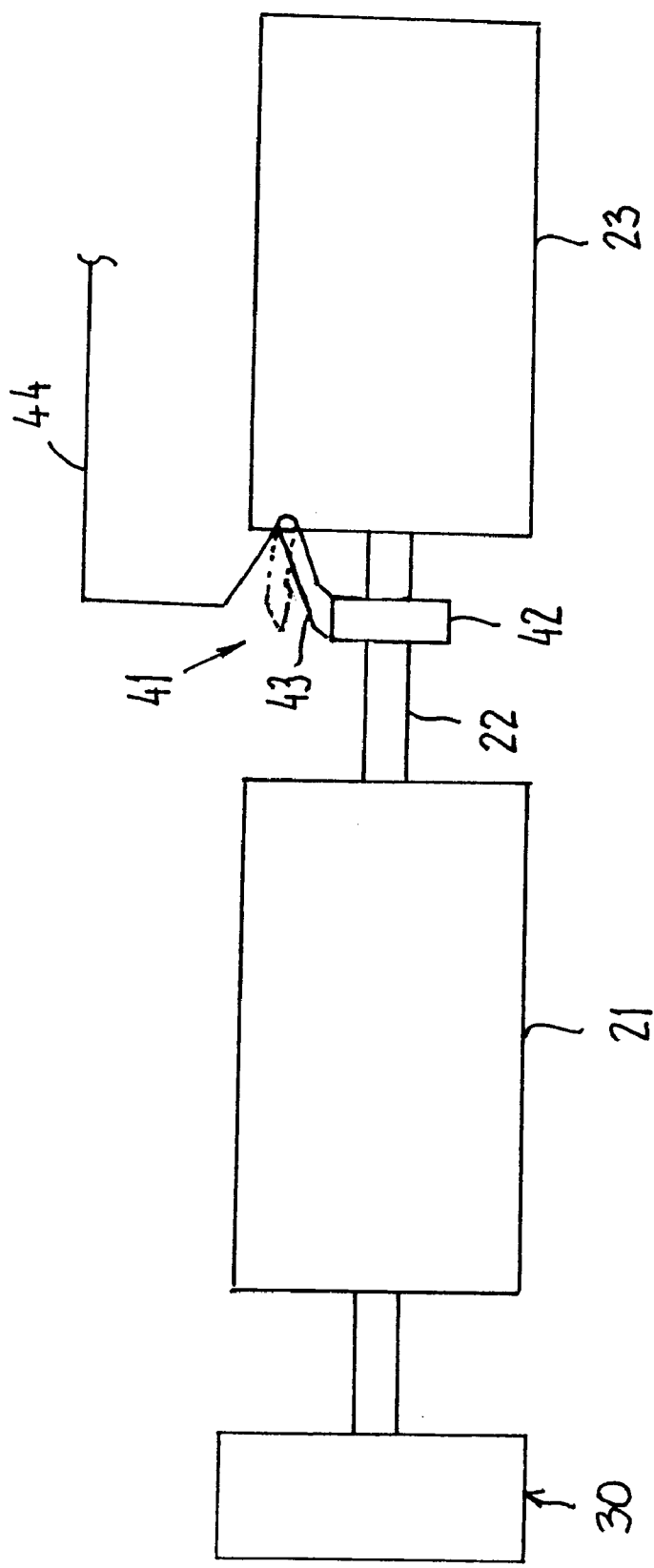
FIG. 2 shows a schematic view of another embodiment of a mechanical portion of the parking lock according to the present invention.

To prevent inadvertent rolling of the vehicle, a parking lock 40 is provided comprising a mechanical component 41 and an electrical component 45. The mechanical component 41 comprises a toothed ratchet wheel 42 connected to the rotor shaft 37 such that the toothed ratchet wheel 42 rotates together with the rotor shaft 37. The mechanical component 41 also comprises a toothed catch 43 for engaging in the ratchet wheel 42. The toothed catch 43 is arranged on the housing 31 such that it is fixed to the housing but pivotable from a latched position shown in solid lines in FIG. 1 to an unlatched position shown in dotted lines in FIG. 1. If the mechanical component 41 is arranged between the transmission 21 and the differential 23, the ratchet wheel 42 is preferably connected to the differential cage, while the toothed catch 43 is arranged on the differential housing such that it is fixed but is pivotable as shown schematically in FIG. 2.

The mechanical component 41 is operated via a control element 26. In FIG. 1, the control element comprises a control lever and is guided in a gearshift console 25. The control lever 26 is connected to the toothed catch 43 of the mechanical component 41 via a suitable connection. In the preferred embodiment, the connection between the control lever 26 and the toothed catch 43 comprises a mechanical connection 44 such as a cable run. The gearshift process will be explained in more detail below.

The control lever 26 is movable to various gearshift positions 28 within the gearshift console 25. If the parking lock is intended to be activated, the control lever 26 is moved to the gearshift position "P". Furthermore, the control lever 26 may be used to shift the transmission 21 to various gearshift positions for driving forward and in reverse, which in the present case are referred to as "R" Reverse, "N" Neutral, "D" Drive forward and "X"-"Y" various driving programs. To produce an appropriate driving program setting when the control lever 26 is moved, the control lever 26 is connected to the transmission 21 via a suitable connection 27 which will not be described in any further detail in the present case.

The various driving programs may comprise, for example, "recuperative braking" which is a driving program that operates the electrical machine 30 as a generator rather than as a motor when the driver lifts his foot off the accelerator pedal. The power produced by the electrical machine 30 during this period is fed into the vehicle battery. The various driving programs may, for example, also include a "steep-grade descent" program in which the electrical machine is controlled to operate as a motor brake, similar to the way that with conventional internal combustion engines brake a vehicle as it is travelling down a hill. The above reference driving programs are merely examples and other driving programs are possible. Accordingly, the invention is not limited to those quoted.

The electrical component 45 of the parking lock 40 comprises a control device 46 connected to the power electronics 35 via an electrical connection 47. Furthermore, various sensor elements are provided, which detect data specific to the vehicle and store such data in the control device 46. The following text refers to two specific sensor elements, but the invention is not limited to the described sensor types.

One of the sensor elements may comprise a position sensor 48 connected to or integrated in the control lever 26. The position sensor 48 is connected via a signal line 49 to the control device 46. Furthermore, the sensor elements may also comprise a speed sensor 50 connected via a signal line 51 to the control device 46. The speed sensor 50 detects the present speed of the vehicle 10, and stores this value in the control device 46.

The method of operation of the parking lock 40 will now be described. The parking lock 40 may be used in addition to a conventional parking brake, so that two different independent braking systems are available for reliably preventing the vehicle 10 from rolling away inadvertently, in particular when parked on a grade.

As is shown in FIG. 1, the ratchet wheel 42 of the mechanical component 41 is connected to the rotor 36 and to the rotor shaft 37 such that they rotate together. During operation, the rotor 36 produces a high torque. When the mechanical component 41 is operated, the toothed catch 43 moves toward the latched position and latches in the ratchet wheel 42 so that the ratchet wheel 42, and thus the rotor 36, are suddenly braked. The torque peaks produced in this way are sufficient to destroy a ratchet wheel 42 and a toothed catch 43 sized for a conventional drive train including an automatic transmission. However, the additional electrical component 45 provided by the parking lock 40 brakes the rotor 36 before engagement of the mechanical component 41.

When the driver wishes to activate the parking lock 40, he moves the control lever 26 to the "P" gearshift position. This gearshift movement is recorded by the position sensor 48. The recordation by the position sensor 48 may be done in widely varying ways. For example, the position sensor 48 may be arranged in the gearshift console 25 between the gearshift positions "R" and "P". Therefore, the position sensor 48 will detect when the control lever 26 moves from the position "R" to the position "P" and will generate an appropriate signal. The position sensor 48 may alternatively be integrated in the control lever 26. In this case, the position sensor 48 may, for example, be in the form of a movement sensor or a proximity sensor which detects the movement of the control lever 26 and transmits an appropriate signal. The invention is not limited to specific embodiments of the position sensor 48.

The signal detected by the position sensor 48 is transmitted via the signal line 49 to the control device 46 where it is processed further. The control device 46 generates an appropriate signal, which is transmitted to the power electronics 35, where it causes the stator windings 33 to be briefly short-circuited. In consequence, a braking torque which brakes the rotor 36 is produced in the electrical machine 30.

The parking lock 40 is designed such that the electrical component 45 is activated in a specific time interval before the mechanical component 41. This time interval may be between 10 and 100 milliseconds. If, for example, the position sensor 48 is arranged between the gearshift positions "R" and "P", it will detect an appropriate signal, which causes the stator windings 33 to be short-circuited, and transmit the signal before the control lever 26 has reached the desired gearshift position "P". The mechanical component 41 of the parking lock 40 is not activated until the control level 26 has finally reached the "P" position. Therefore, the required time interval between the activation of the electrical component 45 and the activation of the mechanical component 41 may be adjusted by selecting a suitable distance between the position sensor 48 and the final gearshift position "P".

Once the rotor 36 has been braked by the braking torque produced by the short-circuiting of the stator windings 33, the mechanical component 41 is activated so that the toothed catch 43 latches into the ratchet wheel 42. As consequence, the rotor 36 is brought to rest. However, since the braking of the rotor reduces the torque of the rotor before the mechanical component is activated, the mechanical component 41 may be designed to be correspondingly smaller than would be required without the electrical component 45.

The parking lock 40 may be reliably activated when the speed of the vehicle 10 is less than a specific maximum speed. However, for safety reasons, if the speed of the vehicle 10 is greater than the maximum speed, the parking lock 40 is prevented from being activated. The speed sensor 50 is provided for this reason. When the position sensor 48 stores an appropriate signal in the control device 46, the present speed of the vehicle 10 is detected via the speed sensor 50 and compared in the control device 46 with a threshold value, i.e., the specific maximum speed, stored there. If the speed of the vehicle 10 is below the specific maximum value, for example 5 km/h, the parking lock 40 may be operated so that the electrical component 45 is activated to produce a temporary short-circuit in the stator windings 33.

When the speed sensor 50 determines a speed which is above a specific limiting value, for example above 8 km/h, the parking lock 40 is prevented from being operated. If, for example, the driver inadvertently moves the control lever 26 to the gearshift position "P" at more than 8 km/h, the position sensor 48 initially produces the signal for activating the electrical component 45. However, this command is overridden by the value determined via the speed sensor 50 so that, in the end, no short-circuit is produced in the stator windings 33.

Although the inadvertent movement of the control lever 26 activates the mechanical component 41 on reaching the gearshift position "P" this does not represent a problem. The teeth of the ratchet wheel 42 and of the toothed catch 43 are designed in terms of shape and separation such that they are prevented from latching in above a specific speed. If this limiting speed is exceeded, the teeth of the toothed catch 43 are thrown away from the ratchet wheel 42 when a latching-in attempt is made. The driver will perceive this throwing-away process by virtue of a noise which indicates the incorrect gearshift demand.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A parking lock for a vehicle having an electrical drive train including an electrical machine having a rotor, a stator with a plurality of stator windings, and power electronics for controlling the electrical machine, wherein said parking lock comprises:

a control element for actuating said parking lock;

a mechanical component movable between a latched position and an unlatched and mechanically connectable to said electric drive train, said mechanical component being operable for moving to the latched position for stopping rotary motion of the rotor relative to the stator of the electric drive train in response to an operation of said control element; and an electrical component connectable to said stator for producing a temporary short circuit of said plural stator windings at a specific time interval before operation of said mechanical component.

2. The parking lock of claim 1, wherein said time interval is within a range comprising 10 and 100 milliseconds.

3. The parking lock of claim 1, wherein said mechanical component comprises a toothed ratchet wheel and a toothed catch.

4. The parking lock of claim 1, further comprising one of an electrical operating device and a mechanical operating device for operating said mechanical component in response to the operation of said control element.

5. The parking lock of claim 1, wherein said electrical component comprises a control device for producing the short-circuit of the stator windings.

6. The parking lock of claim 5, wherein said electrical component comprises at least one sensor element connected to said control device, and wherein said at least one sensor element is designed to produce signal to initiate operation of said control device for producing the short-circuit of the stator windings.

7. The parking lock of claim 6, wherein said at least one sensor element comprises a position sensor.

8. The parking lock of claim 6, wherein said at least one sensor element comprises a speed sensor.

9. The parking lock of claim 7, wherein said at least one sensor element further comprises a speed sensor.

10. An electrical drive for a vehicle comprising a drive train for driving wheels of a vehicle, wherein said drive train comprises:

an electrical machine having a rotor, a stator with plurality of stator windings;

power electronics for controlling the electrical machine;

a transmission connected to an output of said electric machine; and a parking lock comprising a control element, a mechanical component movable between a latched position and an unlatched position and mechanically connected between said stator and rotor of said electric machine, said mechanical component being operable for moving to the latched position for stopping rotary motion of the rotor relative to the stator of said electric machine in response to an operation of said control element, and said parking lot further comprising an electrical component connectable to said stator for producing a temporary short circuit of said plural stator windings at a specific time interval before operation of said mechanical component.

11. The electrical drive of claim 10, further comprising a differential arranged downstream of said transmission.

12. The electrical drive of claim 11, wherein said mechanical component of said parking lock is arranged between said transmission and said differential.

13. The electrical drive as claimed in claim 10, wherein said mechanical component of said parking lock is arranged between said electrical machine and said transmission.

14. The electrical drive of claim 10, wherein said transmission comprises an epicyclic transmission.

15. The electrical drive of claim 10, wherein said mechanical component of said parking lock and said transmission are arranged at least partially within a space enclosed by said electrical machine.

16. The electrical drive of claim 10, wherein said control element comprises a control lever guided in a gearshift console and operatively connected for operating said transmission and said parking lock.

17. The electrical drive of claim 16, further comprising a sensor element including a position sensor connected to said control lever.

18. The electrical drive of claim 10, wherein said parking lock further comprises a control device connected to the power electronics of said electrical machine.

19. The electrical drive of claim 10, further comprising an additional parking brake operatively connected for braking the wheels of the vehicle.

20. A method for operating a parking lock in a vehicle having a drive train with an electric motor, the electric motor having a stator with a plurality of stator coils and a rotor, the parking lock having a latchable mechanical component and an electrical component, said method comprising the steps of:

a.) activating the electrical component of the parking lock for producing a temporary short-circuit in the stator windings of the stator; and b.) activating the mechanical component of the parking lock after a specific time interval has elapsed after said step a.) to latch the mechanical component to the drive train and stop rotary movement of the drive train.

21. The method of claim 20, wherein said step b.) is performed at the specific time interval within the range including 10 to 100 milliseconds after said step a.).

22. The method of claim 20, wherein said step a.) is performed only when the vehicle speed is below a specific limiting speed.

23. The method of claim 22, wherein said specific limiting speed is equal to 5 km/h.

* * * * *